United States Patent [19]
Lewis et al.

[11] Patent Number: 6,008,834
[45] Date of Patent: Dec. 28, 1999

[54] BOUNCING BALL SCANNER

[75] Inventors: John R. Lewis, Acton; Kestutius Norvaisa, Lexington, both of Mass.; Steve R. Gomez, Sinton, Tex.; Jacinto P. Carrera, Newton; Ernest C. Wettstein, Framingham, both of Mass.

[73] Assignee: Polaroid Corporation, Cambridge, Mass.

[21] Appl. No.: 08/564,951

[22] Filed: Nov. 30, 1995

[51] Int. Cl.[6] .................................................. H04N 5/257
[52] U.S. Cl. ........................ 347/241; 347/256; 358/296
[58] Field of Search .................................. 358/296, 298, 358/300, 302; 347/241, 242, 243, 256, 257, 260

[56] References Cited

U.S. PATENT DOCUMENTS

| | | | |
|---|---|---|---|
| 3,573,847 | 4/1971 | Sacerdoti | 346/76 |
| 4,099,829 | 7/1978 | Straayer | 350/6.1 |
| 4,241,382 | 12/1980 | Daniel | 362/32 |
| 4,261,653 | 4/1981 | Goodrich | 350/362 |
| 4,347,507 | 8/1982 | Spooner | 340/705 |
| 4,388,651 | 6/1983 | Sherman | 358/206 |
| 4,458,988 | 7/1984 | Petersen | 350/344 |
| 4,508,422 | 4/1985 | Karlsson | 350/6.8 |
| 4,780,730 | 10/1988 | Dodge et al. | 346/108 |
| 4,848,885 | 7/1989 | Clark | 350/469 |
| 4,935,630 | 6/1990 | Merchant | 250/353 |
| 5,333,057 | 7/1994 | Morikawa et al. | 358/296 |

*Primary Examiner*—N. Le
*Assistant Examiner*—Hai Pham
*Attorney, Agent, or Firm*—Joseph Stecewycz

[57] ABSTRACT

A bouncing ball scanner is described which is a ball driven in a reciprocal motion for reflecting image-bearing light onto a photosensitive medium. The image-bearing light can be dictated by a computer, in which case the photosensitive medium may be film for a printed output, or the image-bearing light may be reflected from a subject having an image imprinted thereon, and the photosensitive medium may be a charge coupled device where the image is being read into a computer. The bouncing ball scanner comprises a ball being driven in a reciprocal motion by electromagnetic forces acting thereon. The motion of the bouncing ball is substantially linear in each direction so as to allow ease of calculation of ball position thereby ease of knowledge of pixel position on the photosensitive medium.

38 Claims, 12 Drawing Sheets

BOUNCING BALL SCANNER

BACKGROUND OF THE INVENTION

The present invention relates generally to optical scanning devices and, more particularly, the invention relates to a scanning device using a bouncing ball to deflect image-bearing light across a photosensitive medium.

In a conventional optical scanner, a polygon mirror is rotated by an electric motor. In such an optical scanner, the polygon mirror is large and, thus, to achieve sufficient speed the supporting mechanical design is complex. Further, more mechanics must be used so that vibrations, due to the electric motor for example, don't affect the polygon mirror. Consequently, the optical scanner becomes complicated and the total volume and weight thereof becomes greater. Therefore, the conventional optical scanner is not suitable for various portable apparatuses which need to have a small volume and utilize minimal electric power.

To solve these problems, various prior art inventions have disclosed using light deflecting apparatuses using a biomorph-type piezo electric element or a multi-layer type piezo electric element. These apparatuses still use mirrors that are heavy, though. As elements of the printer or scanner wears the movement of the mirror becomes unpredictable and non-uniform making accurately printing or scanning virtually impossible.

Accordingly, it is an object of this invention to provide an improved optical scanning reflector.

It is another object of this invention to provide an optical scanner that is compact in size and uses minimal energy such that it can be utilized in compact portable devices.

It is a still another object of this invention to reduce the complexity of the scanning element thereby reducing manufacturing costs.

It is a further object of this invention to provide an optical scanner with a minimum of movable mechanical parts that might deteriorate from use and wear or otherwise degrade the scanning performance thereby achieving uniform predictable deflection.

These and other objects of the invention will be obvious and will appear hereinafter.

SUMMARY

The aforementioned and other objects are achieved by the invention which provides an imaging apparatus for scanning image bearing light across a photosensitive medium. The photosensitive medium can be a chemical-based medium such as a conventional photographic film where the image-bearing light is used to print on the film, or the photosensitive medium can be an electronic photosensor array or grid, such as a charge-coupled device ("CCD"), one or more photodiodes, or a photoreceptor for xerography. The latter being useful for reading image-bearing light into a computer to create an electronic facsimile of an original image therein. The imaging apparatus comprises a capsule secured within a housing by an elastic means, redirection means disposed within the capsule, and vibration means for effectuating a reciprocal motion of the capsule.

The capsule has a proximal end portion and a distal end portion integrally joined by a lateral surface. In the preferred embodiment, the capsule is cylindrical where the proximal end portion and at least a horizontal section of the lateral surface is optically transmissive;

The elastic means mechanically secures the capsule to the housing. The elastic means allows reciprocal motion of the capsule within the housing along a central axis.

The redirection means is enclosed within the capsule for redirecting the image bearing light traveling in a first direction to travel in a second direction substantially orthogonal to the first direction. The image-bearing light is then incident upon the photosensitive medium which is oriented transverse to the optical path of the image-bearing light traveling in the second direction. The redirection means is usually spherical but can also be non-spherical as long as a spin is controlled. In the case of the imaging apparatus as a printer, the redirection means is highly reflective. In the case of the imaging apparatus as an electronic scanner, the redirection means can be a reflective device or a spherical lens.

The vibration means vibrates the capsule to cause the aforementioned reciprocal motion. The reciprocal motion then forces the redirection means to impact repetitively off the proximal end portion and the distal end portion of the capsule thus reciprocating along the central axis. When image-bearing light is shone through the proximal end of the capsule, the reciprocating redirection means redirects the image-bearing light across a line on the photosensitive medium.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of printing and scanning devices and may be embodied in several forms, it is advantageously employed in connection with a printer for printing on a conventional photographic medium and a scanner for scanning a subject into a digital computer. Though these are the forms of the illustrated embodiments and will be described as such, this embodiment should be considered illustrative and not restrictive.

Figure 1:
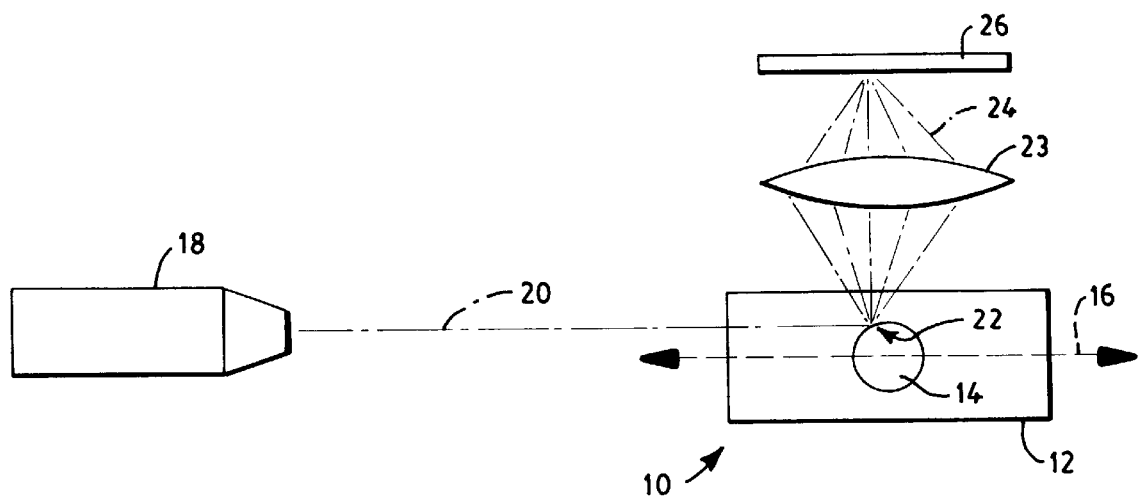
FIG. 1 is a schematic diagram of a bouncing ball scanner in accordance with the invention.

Referring now to FIG. 1, the bouncing ball scanner 10 is shown having a capsule 12 enclosing a reflective ball. The capsule 12 is generally a cylindrical capsule closed on either end containing the reflective ball 14 which moves along a central axis 16. The capsule 12 is vibrated as will be later herein described such that the reflective ball bounces in a reciprocal manner along the central axis 16. The reflective ball 14 is fabricated from a reflective material such as a polished metal or an industrial quality gem such as ruby or sapphire, or a coated glass as is commonly known in the art. The modulated light source 18 projects image-bearing light 20 along a path substantially parallel to the central axis 16 so as to impinge upon the reflective ball 14 an upper portion of the reflective ball 14. The image-bearing light 20 is color and intensity modulated to sequentially project individual pixels in an image to form a line of image information. Multiple lines of image information are likewise sequentially projected to form an entire image.

The image-bearing light 20 is reflected off of the reflective ball 14 to form a redirected light beam 24 traveling substantially transverse to the central axis 16 so as to be incident upon a photosensitive medium 26 through a projection lens 23. The projection lens 23 may be left out when the bouncing ball scanner 10 is used with a contact printer, but is otherwise required to converge the diverging light beam 24. Further, the projection lens 23 can be a system of two or more lenses as required by the optical design to compensate for, inter alia, astigmatism where light rays will not otherwise converge. Such an effect can occur in the bouncing ball scanner 10 due to the fact that a light beam having a circular cross-sectional geometry is being projected on an upper surface of a sphere causing an elliptical spot to be illuminated. The multiple centers of the elliptical spot must be accommodated by the optical system to converge such a redirected light beam 24.

As the reflective ball 14 reciprocates within the capsule 12, the redirected light beam 24 travels linearly across the photosensitive medium 26 thereby imaging one line on the photosensitive medium 26. The photosensitive medium 26 is driven in a direction perpendicular to that of the imaged line on the photosensitive medium such that each reciprocation of the reflective ball 14 draws the next consecutive line on the photosensitive medium 26, thereby creating an image thereon.

Figure 2:
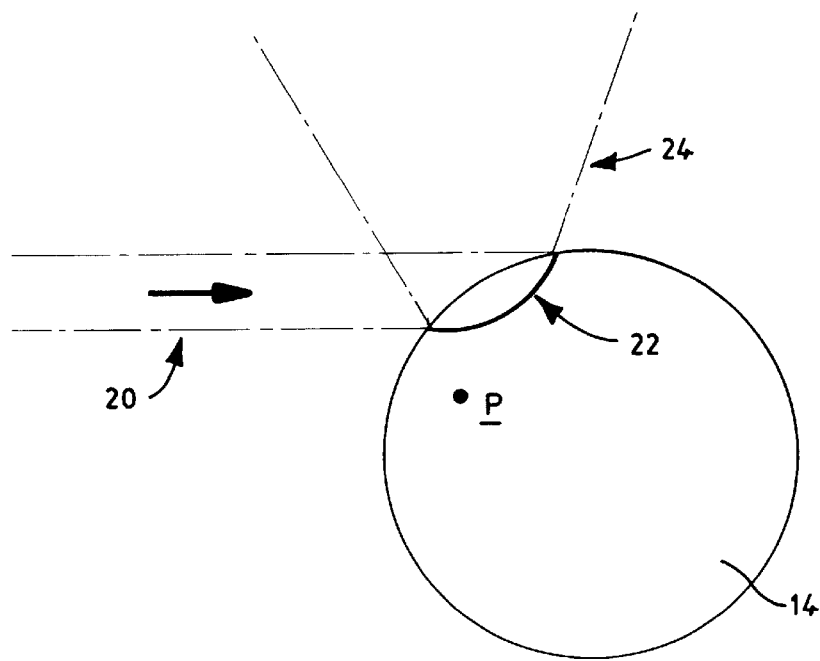
FIG. 2 is a perspective view of a ball found in the bouncing ball scanner of FIG. 1 showing light deflection.

FIG. 2 further illustrates how the image-bearing light 20 impinges upon the reflective ball 14 to create the redirected light 24. Since the image-bearing light 20 is impinging upon the reflective ball 14 on a spot 22 in an upper region of the reflective ball 14, the redirected light 24 is redirected at angles dependent upon the location of the spot 22. In order to properly image the redirected light 24, the spot 22 is located such that a virtual focus point 'P' is located toward the central axis 16 of the reflective ball 14. In this way, the cone of light describing the redirected light 24 is dispersed in controlled manner and optics can be easily designed therefor.

Figure 3:
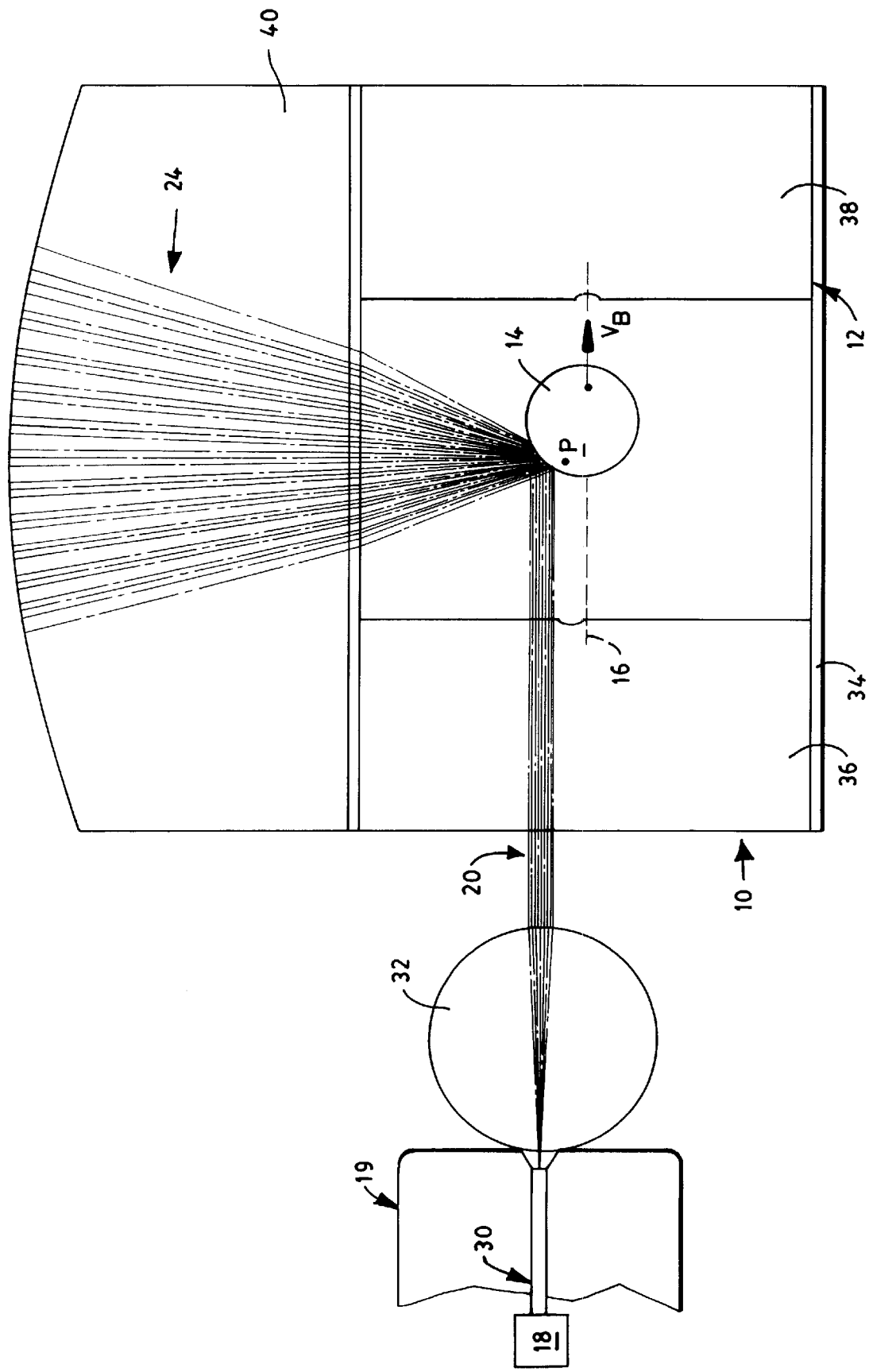
FIG. 3 is an expanded schematic diagram of a bouncing ball scanner of FIG. 1 showing optical interfaces.

Referring now to FIG. 3, the bouncing ball scanner 10 is shown for an optical fiber 30 which is projecting light from the modulated light source 18 through a spherical lens 32, thus making the image-bearing light 20 substantially collimated. The reflective ball 14 is shown bouncing along the central axis 16 with a velocity $V_b$. The reflective ball is held as before within the capsule 12 and is reciprocating along the central axis 16 by impacting a proximal wall 36 and a distal wall 38. The proximal wall 36 and the distal wall 38 are secured within cylindrical housing 34. They are oriented such that the ball impacts the walls 36, 38 and travels along the central axis. In the preferred embodiment, this orientation is performed by placing a preferred curvature in the walls 36, 38. The proximal wall 36 is transmissive to light such that the image-bearing light 20 passes therethrough substantially unaltered. As before, the image-bearing light 20 reflects off of the reflective ball 14 and travels out of the capsule 12 through the cylindrical housing 34 which is also transmissive. The redirected light beam 24 is shown fanning in a way previously described off of the reflective ball 14 and therefore a convex lens 40 is attached to the capsule 12 or in an optical path thereafter such that a cone of the redirected light is drawn inward.

In order to properly place an image onto a photosensitive medium 26, the relative position of the reflective ball 14 within the capsule 12 must always be known. This is true because the image-bearing light 20 is modulated with image data reflecting individual pixels on a line being imaged across the photosensitive image 26. For proper placement of those pixels within the image, the position of the reflective ball 14 must be known at substantially all times.

Figure 4:
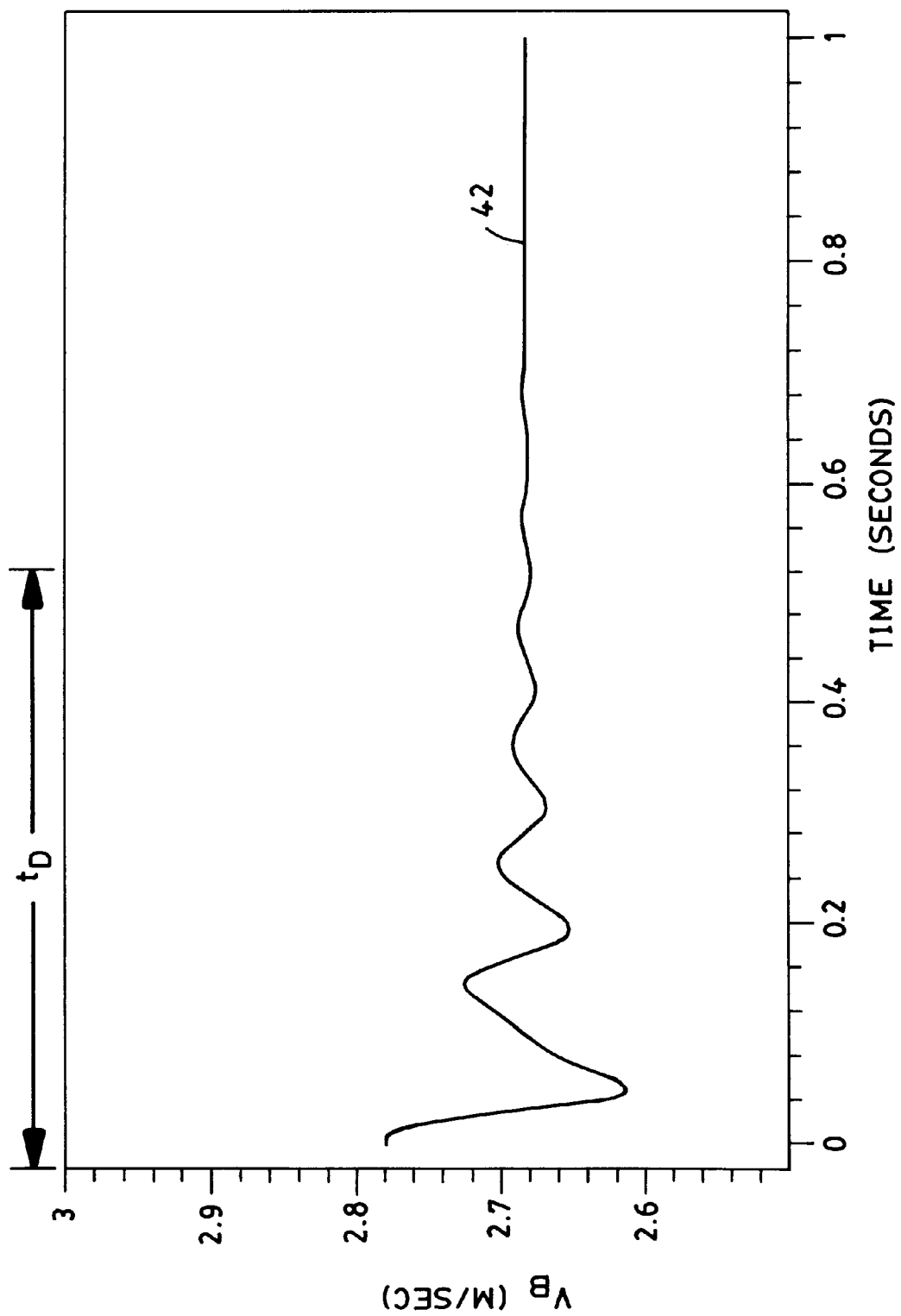
FIG. 4 is a graph of speed vs. time for the bouncing ball scanner.

FIG. 4 shows the velocity $V_b$ of the reflective ball 14 where time zero is the beginning of a disturbance to the capsule 12. In practice, initialization causes such a large disturbance and this graph shows how the velocity activates a steady state. The graph of the velocity 42 illustrates damped oscillations where the damping time $t_D$ is damped over a period of 0.5 seconds after which the velocity $V_b$ becomes substantially constant. As can be seen from the graph, the velocity 42 has a large amplitude immediately following the disturbance. The ball 14 then "catches" at which time the oscillations damp and the amplitude decrease to a substantially steady state. This graph illustrates transient behavior for conditions that yield stable behavior. The prediction is that speed perturbations should settle out in less than a second. Some non-linear oscillatory behavior occurs while settling though. This case is for a frequency of 140 hertz, a path length of 9.6 millimeters and a wall speed of 0.07 meters per second. The steady state ball speed is 2.68 meters per second.

Figure 5:
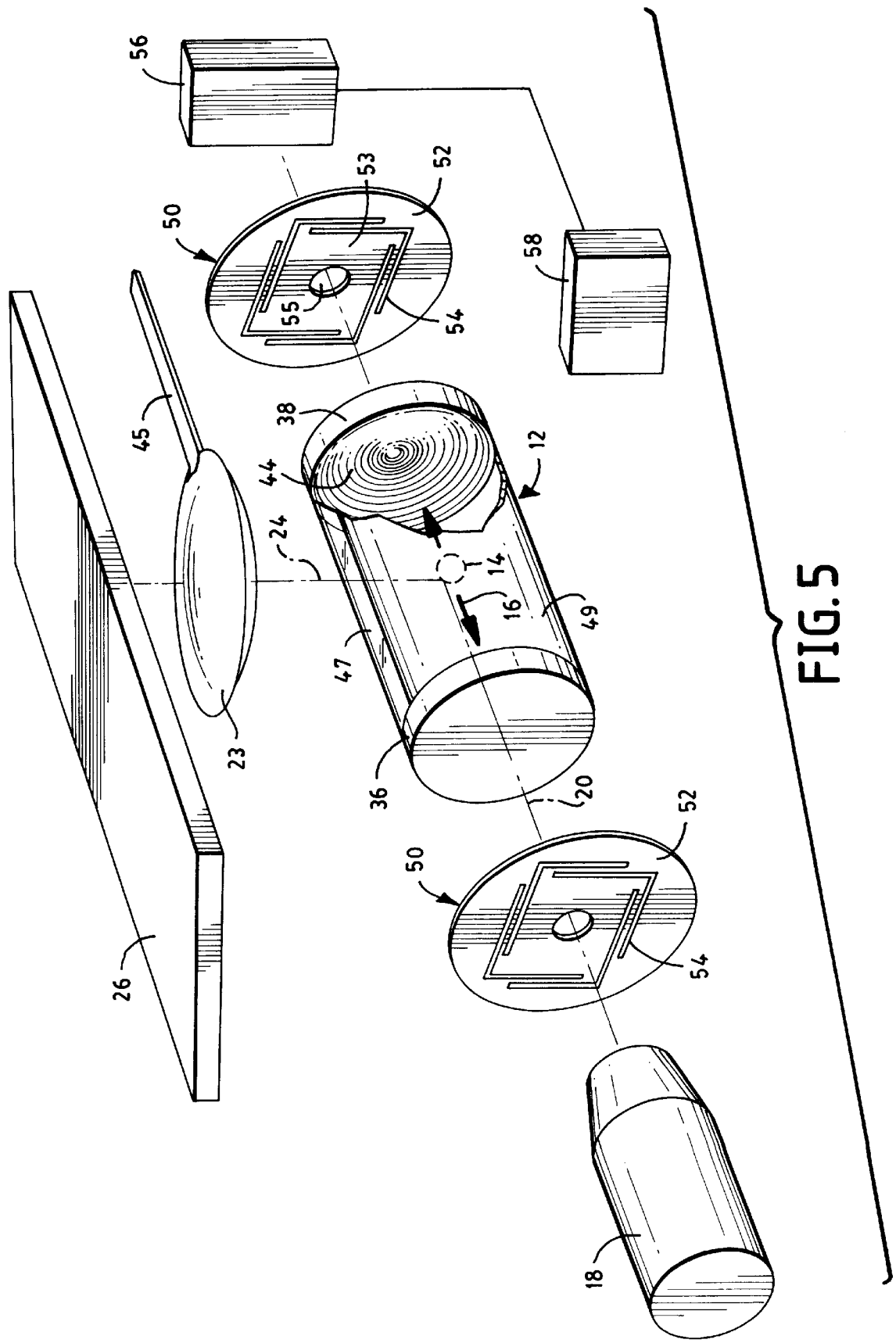
FIG. 5 is a schematic diagram of the bouncing ball scanner as implemented showing a preferred type of spring mechanism and driver circuitry.

Referring now to FIG. 5 where a bouncing ball scanner 10 is shown with an assembly for vibrating the capsule 12. The capsule 12 is disposed between two springs 50 which are attached to the proximal end 36 and distal end 38 of the capsule 12. In contrast to the previous embodiments of the invention, the capsule 12 in this embodiment is not a unitary cylindrical housing with end caps. Here, the capsule 12 has a lateral surface 49 that is formed to substantially enclosed an interior portion which leaving the ends open to accommodate end portions 36, 38. The lateral surface 49 can be made of various materials such as metals or plastics and need not be transparent. Further, the cross-sectional geometry is not limited; it can be circular, square, et cetera.

A slot must be left in the lateral surface 49 though to receive a lens 47. The lens 47 traverses a length of the capsule 12 an is cemented into the slot by an adhesive (not shown). The lens can be, in its simplest form, transparent glass providing egress for the redirected light beam 24 or can be optical glass to assist in the optical design. In the preferred embodiment, the lens 47 is an optical fiber which diverges the redirected light 24 thereby helping to alleviate the aforementioned astigmatism. Alternatively, the optical fiber could focus one direction, the 'X' direction in a Cartesian coordinate system for example. The projection lens 47 would be left to focus for the 'Y' direction. This also reduces optical complexity. Since the optical fiber is situated close to the ball 14, the redirected light 24 has little opportunity to diverge before it is collimated by the lens 47, thereby alleviating a need for additional optics.

Further, the projection lens 23 can be a system of two or more lenses as required by the optical design to compensate for, inter alia, astigmatism where light rays will not otherwise converge. Such an effect can occur in the bouncing ball scanner 10 due to the fact that a light beam having a circular cross-sectional geometry is being projected on an upper surface of a sphere causing an elliptical spot to be illuminated. The multiple centers of the elliptical spot must be accommodated by the optical system to converge such a redirected light beam 24.

In this embodiment, the springs 50 are composed of a disk 52 having 'L'-shaped slots 54 where the 'L'-shaped slots 54 are discontinuous 'L'-shaped cuts through a resilient material which overlap from a radial perspective such that the center portion of the disk 52 is freely movable relative to the plane of the disk 52 but is biased toward a substantially planar orientation.

The springs 50 also have a center hole 55 to allow the image-bearing light 20 from the modulated light source 18 to pass therethrough. In the preferred embodiment, the spring 50, is fabricated with a ferrous material such that it is magnetically sensitive. The ferrous material can be an entirely ferrous spring 50 or other materials impregnated with ferrous elements so as to achieve magnetic attraction.

The capsule 12 secured to the springs 50 with an adhesive (not shown) or other such securing method as is commonly known in the art so as to allow the springs 50 to be secured to an outer housing while allowing the capsule 12 to reciprocate along the central axis 16. A magnetic coil 56 is disposed next to the spring 50 which is secured to the distal end 38 of the capsule 12. Magnetic coil 56 is driven by a coil driver 58 which sends electric pulses to the magnetic coil 56 so as to oscillate a magnetic field from the coil 56 to the spring 50 between an attractive and a repulsive state, thereby causing the capsule 12 to reciprocate along the central axis 16.

The electric pulses in the magnetic coil 56 are transmitted at a frequency that is the resonant frequency of the mass suspended from the springs 50, i.e. the capsule 12 and the ball 14. By matching the resonant frequency of the mass a small magnetic force excites a large motion in the mass.

Movement of the spring 50 causes an amount of movement within the capsule 12 which forces the ball 14 against the opposing ends 36, 38 of the capsule 12 The cavity 44, in the opposing ends 36, 38 ensure alignment of the reflective ball 14 along the central axis 16 after each impact with the opposing ends 36, 38 thereby ensuring a regular, uniform motion once the steady state condition, previously discussed, is attained.

The projection lens 23 is also shown in this embodiment secured to a stationary portion of the bouncing-ball scanner 10 by an elastic stalk 45. The elastic stalk 45 compensates for gravitational forces that will be discussed subsequently. The stalk is substantially rigid but has a spring constant chosen to allow the stalk 45 to bend allowing the lens 23 to move to adapt to the orientation of the bouncing ball scanner 10, i.e., the spring constant is chosen to allow the lens 23 to be displaced relative to a normal position by an amount substantially equaling displacement due to gravity of the ball 14 within the capsule 12. For example, when the axis 16 is horizontal and the lens 23 is oriented vertically above the ball 14 the lens 23 will droop slightly closer to the capsule 12 thus compensating for gravitational effects on the ball forcing the ball away from the lens 23. When the axis 16 is horizontal and the lens 23 is oriented vertically below the ball 14, on the other hand, the lens 23 will droop slightly away from the capsule 12 thus compensating for gravitational effects on the ball forcing the ball toward the lens 23. If the axis 16 is vertical then the ball 14 travels a substantially straight line and the stalk 45 remains substantially straight.

For most applications, the ball path is optimally a straight line whose location relative to the optics is independent of the orientation of the cell. In an environment having little or no gravitational forces and where forces can be neglected by design, a straight line ball path is the default case and is achieved by the design of the bouncing ball scanner 10 as thus far described. On the earth's surface or where the design does not allow for avoiding effects due to gravity (frequency must be fairly slow, for example) however, the effect of gravity can be great enough to cause the ball to deviate from this ideal course by an amount significant to the application.

There are two effects on the ball 14 due to gravitational forces. One is the bowing of the trajectory and the other is a shift from the cell axis. The bowing effect can be reduced by using a cell of symmetric design. For such a cell, the ball 14 is falling for only half the time between impacts. For the other half it is rising, hence the time is halved. For the preferred case (400 HZ), the bowing position error becomes only two microns as will be discussed in detail hereinafter.

For stationary applications, the shift can be compensated for at the time of manufacture by fixed adjustment of the optics. If the device is inverted, the shift will be in the opposite direction, and thus, fixed adjustment of the optics cannot provide optimal performance for both cases. There is a way to compensate for the shift even for non-stationary applications in which the orientation changes. This is done generally by allowing the position of some optical elements to be affected by orientation in the same way the trajectory is affected. Selected optical elements are mounted elastically so that displacements proportional to components of the gravitational force occur. In the preferred embodiment, this is achieved by mounting the lens 23 on the elastic stalk 45.

Analysis of the optics indicates that the most important relationship to maintain is that between the projection lens 23 and the trajectory followed by the ball 14. It is also worth mentioning that the shift of the cell itself is kept small by the design of springs 50. These are stiff to transverse displacements, while allowing the necessary axial motion of the cell.

These requirements can be met by mounting the lens 23 on a stalk 45 allowing displacement in two directions, while being stiff in the third direction. The length of the stalk 45 must be great enough so that the angles associated with the displacements are acceptably small. The axis of the stalk 45 is parallel to the trajectory of the ball and The stiffness of the stalk 45 is adjusted so as to track the shift of the trajectory.

For the preferred case (400 Hz operation, symmetrical cell, minimum radii compatible with stability, 2 mm. path length), the ratio of lens mass to stalk stiffness should be such that the natural frequency is 180 Hz. The stalk spring should be lossy so as to avoid resonant amplification of ambient vibrations.

Figure 6:
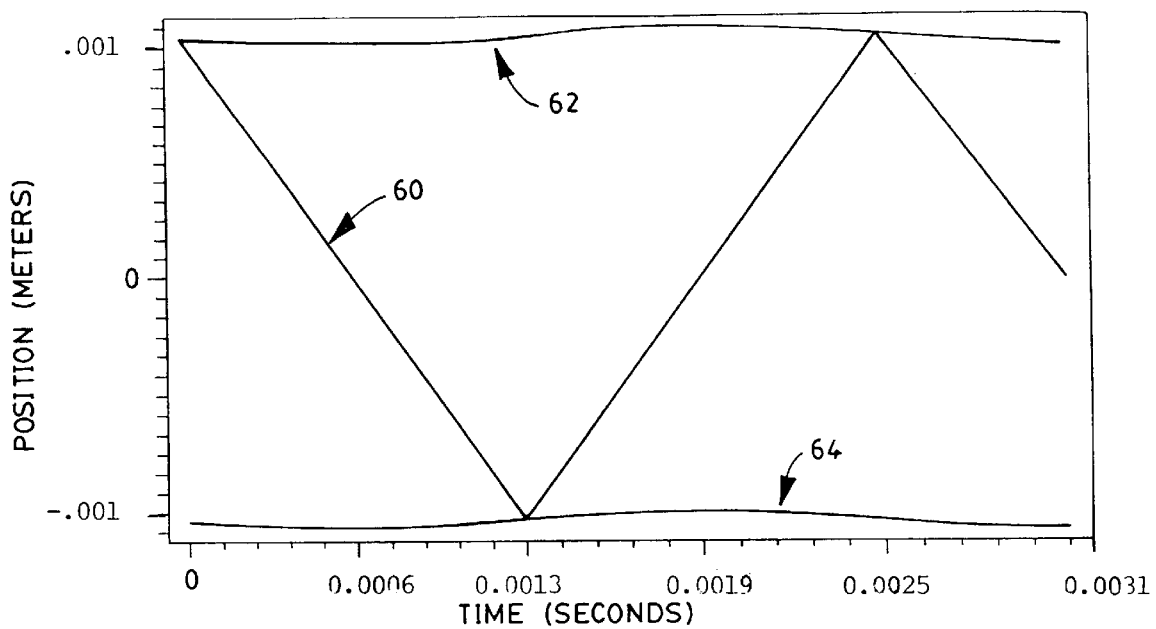
FIG. 6 is a graph of ball position vs. time with respect to side wall motion of the bouncing ball scanner.

FIG. 6 shows that as a proximal wall position 62 moves that the position of the distal wall 64 also moves in an equal and corresponding way. The ball position 60 is then driven in a substantially linear fashion corresponding to the movement of the proximal wall 36 and the distal wall 38. FIG. 6 shows completely linear ball position 60 which is consistent with a capsule 12 having no effect due to gravity.

While this is not the case with a normal commercial setting, it is approximately true due to the relationship that:

$$S = \frac{1}{2}at^2$$

where
S=position error over the capsule length
a=acceleration in meters per second per second
t=time between impacts Plugging in typical data for the bouncing ball scanner 10, the average time between impacts, t, is approximately equal to $\frac{1}{800}$ of a second. Plugging this into the above equation, $t^2$ is approximately $1.6 \times 10^{-6}$ s$^2$ and the acceleration due to gravity is approximately 9.8 m/s$^2$ making the positional error due to gravity s approximately $7.7 \times 10^{-6}$ m, or 7.7 µm. When compared to a 2 mm. Distance this error is relatively small. To reduce the error, the speed of the ball can be increased. Doubling the speed divides time, t, by one half causing the error to be quartered. Alternatively, adjustments can be made to the optical system which compensates to the forces due to gravity upon the optical system such as using a flexible stalk 45 as was previously described.

Figure 7:
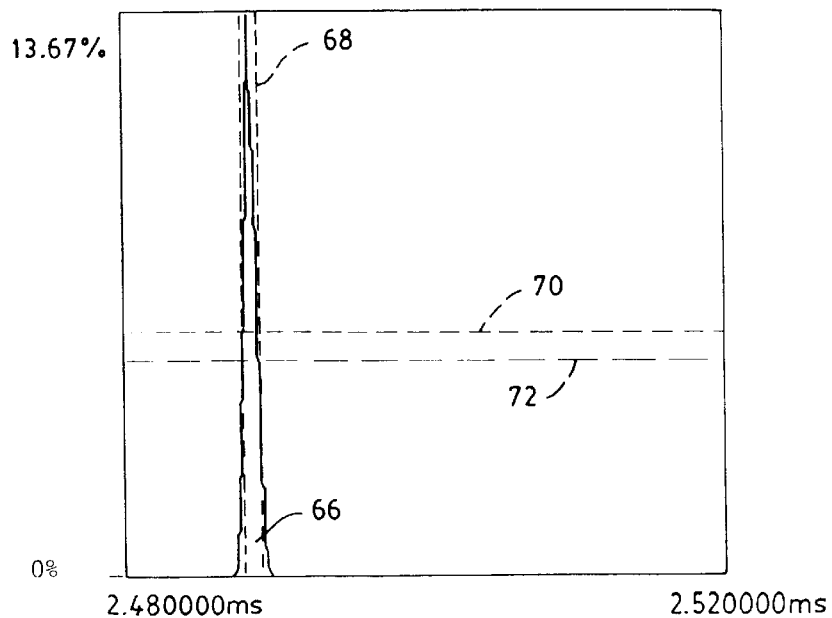
FIG. 7 is a graph indicating predictability of ball motion as a function of time.

FIG. 6 therefore shows straight line segments that trace the position of the ball between impacts for bouncing ball scanner of FIG. 5. The proximal and distal ends 36, 38 of the capsule 12 move together with a constant separation of 0.002 meters in this example and the frequency of the sinusoidal motion being 400 hertz. For the conditions set in this simulation, the impacts have little effect on capsule wall speed. Equilibrium is reached when the ball impacts each wall at a time when the wall speed is just what is required to exactly reverse the speed of the ball again in the case where gravity is neglected. If these conditions are not met, then the impact phase will change so as to obtain them. If the peak speed of the walls are not enough to make up energy lost in impacts, then there is no solution. Otherwise the phase can be changed so as to reduce the speed at impact by approaching close to the moments when the walls are paused at the extremity of motion. This is what happens if the amplitude of the cell motion is much more than is required to compensate for losses. FIG. 7 is a histogram of time interval data for the bouncing ball scanner such as those described in FIGS. 5 and 6 but with different dimensions and operating frequency. The figure itself is test data that was collected over more than 82,000 samples and yet still shows less than half of a microsecond timing uncertainty. Timing irregularity of 0.3 microseconds, which was the standard deviation at a ball speed of 1.3 meters per second implies 400 nanometers positional uncertainty. The path length of the ball is 3.31 millimeters. This then implies 8000 resolvable locations in a line. The performance in the preferred case will be similar.

The bouncing ball scanner described in FIGS. 5 through 7 is based on a spherical object in continued motion within a small capsule. The ends of the capsule are shaped to give a preferred axis of motion as previously described. The diameter of the capsule is large enough that the lateral surface may be ignored once steady state is achieved.

While the reflectivity and convex curvature of the spherical object are useful for optical scanning, both mathematical analysis and indirect laboratory observation have shown that the motion of a non-spherical object can be sufficiently stable for practical application. Improved performance, or smaller size can therefore be obtained by using a non spinning, and/or non spherical objects within the capsule.

SIMPLE EXAMPLE

The ends 36, 38 of the capsule are made of a smooth substance. Glass, for example, would be preferred to a grainy material such as steel. Over the limited region that impacts occur, the surface 44 of the ends 36, 38 is very well approximated by the surface of a sphere of a given radius. The line between the centers of these two spheres defines the central axis 16 of motion. Such a central axis 16 is defined despite any alignment errors in assembling a cell due to the arcuate shape of the proximal wall 36 and the distal wall 38. The arcuate shape of the walls can be expanded to form two virtual sphere where a line drawn between the center of each virtual sphere defines a path of travel of the ball 14.

The next step of analysis depends on whether the moving object is spherical. When a spherical object 14 reaches the limit of it's motion by contact with an end surface 36, 38, a constraint is placed on the location of the sphere center. In fact, an effective surface can be defined by tracing out the location of the sphere center as it is rolled around on the end surface. Geometric considerations show that this equivalent surface is also a sphere section. Thus the problem of tracking a finite size sphere as confined by actual end plates has been transformed to one of a point confined by two spherical surfaces.

For the most realistic simulation, the effects of gravity and air friction must considered. Without air friction, then the object's trajectory is determined by conservation of momentum and energy. The trajectory is, therefore, a section of a parabola. The intersection of this trajectory with an end surface defines the next impact.

The law of reflection gives the velocity of the object after the impact as a function of the velocity before the impact. Further, the initial and final velocity of the wall must also be included in the set of relationships. One phenomenological model gives the relative velocity after the impact as some fraction 'a' (coefficient of restitution) of the initial relative velocity, with the normal component reversed. A slight generalization treats the normal and tangential relative velocities differently, and assigns '$a_n$' as the normal restitution, and '$a_t$' as the tangential resolution.

The trajectory then, given some initial position and velocity, can be traced. The initial position and velocity by the law for the trajectory determine the location of the next impact. At that location, the surface normal, and its state of motion, together with the velocity of the ball, determine, by the law of reflection, the new velocity for the ball. This in turn defines the next trajectory and impact, ad infinitum.

In this model, the moving object losses energy to air friction, or to impacts with restitution less than unity. The velocity of the wall serves as a source of energy input to the ball.

In the simple case, stable, periodic motion can be achieved. If air friction, and gravity are neglected, then the trajectory of the point is a straight line. If the walls are taken to be stationary, and the restitution unity, then the trajectory angle of incidence equals the angle of reflection, and the object's speed is unchanged. Thus, the tracing follows the same rules as tracing for a ray of light. As is well known for the aforementioned example, the behavior depends on the separation and curvatures of the end surfaces 36, 38 such that "stable" behavior can occur. For optics, this means that the trajectory may periodically precess about the axis which may be undesirable for some applications.

The addition of damping to a stable resonator results of settling the motion down to the axis of the resonator. This naturally occurs since some energy is always lost in acoustic waves radiated at impact. The phenomenological form of this is that the normal and tangential restitutions is less than unity. The oscillations abate and only that motion driven by the wall motion persists.

Gravity shifts or distort the steady state path. If the cell is oriented vertically, then gravity acts to increase the speed of the object at the bottom of its trajectory. If the cell is oriented horizontally, then gravity will displace the path downwards and distort the path to a parabolic shape. These effects become less prominent as the device is operated at higher frequencies over shorter path lengths.

For a non-spinning ball the effects are similar to those given for lateral damping. If the ball is spinning, then air friction is one mechanism to damp contemporaneous oscillations. Another mechanism is that spin couples to lateral motion at impact, i.e., the spin causes lateral displacement of the ball upon impact with a lateral surface. The curvature of the distal and proximal ends 36, 38, of the capsule 12 quickly return the ball 14 to its preferred path of motion, and the spin ceases after initialization of the system 10. For example, a spinning ball with zero tangential velocity before impact would be expected to have some tangential velocity after impact. Once energy been transferred from spin to lateral motion, then any mechanisms that damp lateral motion would also damp spin. Since mathematical modeling, as well as lab observations indicate that damping of lateral motion occurs, there is good reason to believe that in the current case that the spin of the ball is attenuated as time advances.

As described thus far, there is still no preferred orientation for the ball. Though the rate at which orientation changes is expected to become quite slow, there would still be some random wanderings due to perturbations. There are many ways to provide a preferred axis so as to overcome these random wanderings. For example, the ball may be provided with a magnetic dipole, and a uniform magnetic field be provided over the capsule interior. It is well known in the art that in such case there will be a restoring torque so as to align the dipole with the field. This would reduce the number of degrees of freedom in orientation from three to one. The ball can still spin randomly on an axis parallel to the magnetic field.

Such a constraint is useful since it separates the zones where impact occurs from those where reflection is to occur. Thus, if the magnetic field were transverse to the motion of the ball, the impacts would occur in somewhere in the magnetic equatorial region, while the reflection would occur towards one of the magnetic polar regions (at 45 degrees longitude). The ball may then be made of a material of poor reflectivity, but good mechanical properties to withstand impacts. The polar regions could be coated for high reflectivity. Except for a startup transient, the polar region would be free from direct impact. Though stress waves would still be transmitted to the poles, the degree of stress would be expected to be much less than for direct impact. The longevity of such coatings would thus be improved.

If a sphere is flattened slightly, at the poles for example, then a restoring torque will be provided for impacts near the poles. At a pole, the radius of curvature is larger than for the original sphere. Thus the center of mass lies between the point of impact on the sphere surface and the center of curvature. This provides a restoring torque. Whether this leads to a stable motion depends on other "gain" parameters in the system. For example, the torque so imparted results in an angular speed inversely proportional to the moment of inertia of the body. If this angular speed is too great, then the error will be over corrected, resulting in oscillations. A long transit time from one end of the cell to the other increases the time the angular speed is integrated, and thus adds to the "gain". A very slight flattening of the sphere is sufficient to obtain the preferred axis without introducing stability concerns.

To explore this behavior more fully, an extension of the simulation example described above can be written to include the effects of spin and non-spherical shapes allowing prediction of behavior of more radical departures from spherical shape.

A flattened sphere provides the separation of impact and reflection as described above without the requirement for an additional external orienting field. If two constraints such as described above are active, then the orientation of the body is determined. In fact, it is over-determined. A balance between the constraints results, depending on their relative strengths. A useful case to consider is where the object is a sphere, slightly flattened at its geometric poles. It also has a magnetic dipole axis perpendicular to the geometric axis. It is used in a capsule with a magnetic field perpendicular to the axis of motion. The orientation of the object can in fact be controlled by varying the direction of the magnetic field while still keeping it in the plane perpendicular to the axis of motion. The orientation of the object is such that it's 'geometric' pole will be parallel to the axis of the cell while it's magnetic dipole will point in the direction of the magnetic field.

An example of the above system uses a reflective sphere 1000 microns in diameter intersecting a shaft of light approximately 80 microns in diameter. The sphere deflects the beam ninety degrees and diverges the beam. The impact contact on the sphere is 25 microns in diameter. Thus, much of the surface of the sphere is not used and, therefore, the sphere is many times more massive than necessary to provide its optical and mechanical function.

Figure 8:
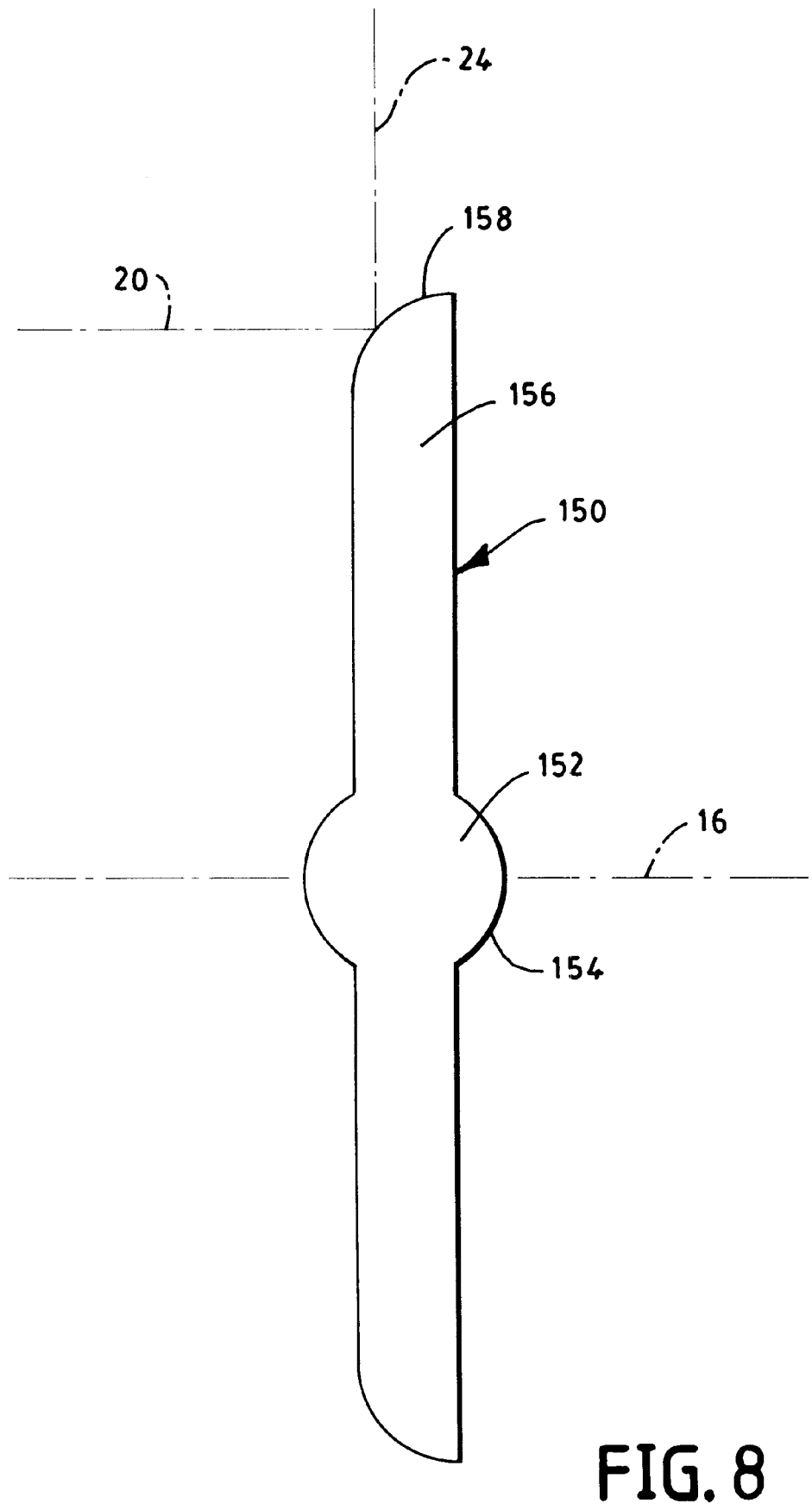
FIG. 8 is an alternative embodiment of a non-spherical object to be used in place of the ball in the bouncing ball scanner of the invention.

In an alternative embodiment illustrated in FIG. 8, a non-spherical body 150 is used in place of the sphere. The non-spherical body 150 comprises a rod 156 which, in the preferred embodiment is eighty microns in diameter and seven hundred microns in length, and an oblate spheroid 152 at a center position on the rod 156.

One end of the rod has a surface 158 having substantially the same arc and size as the spot 22 illuminated by the light on the spherical ball 14 referred to above. The rod 152 is magnetic with its dipole axis the same as the axis of the rod 152 and the surface 158 of the rod 152 is highly reflective.

The rod 156 is embedded in an oblate spheroid 152 made of a material of smooth surface and high mechanical strength. In the preferred embodiment, the oblate spheroid 152 is two hundred microns in diameter. The geometric axis of the spheroid 152 is perpendicular to the rod 156 and parallel to the axis 16 of the capsule 12. A magnetic field is provided so that the end of the rod 156 remains illuminated by the shaft of light in the capsule 12. This same magnetic field can also be used to reorient the rod 156/spheroid 152 combination so as to provide an additional degree of freedom. That is, the magnetic field can be adjusted to move the geometric axis thereby deflecting light at an angle with respect to the axis 16 of the capsule 12.

Further, the oblate spheroid 152 has impact areas 154 which have an arcuate shape with an arc that matches the spherical ball 14 previously described. By doing so, the overall design of the capsule 12 does not change to accommodate non-spherical objects.

An advantage of this design is that the oblate spheroid 152 can be made of a material having different properties than that of the rod 156. While the surface 158 of the rod 156 must be highly reflective, the oblate spheroid 152 does not. Instead, the oblate spheroid 152 should be resilient and hardened such that continuous impacts do not damage or distort the structure.

For the added complexity, a substantial reduction in moving mass is obtained. The ratio of sphere volumes of a sphere to the oblate spheroid 152 such as that described is $5^3=125:1$. The added mass of the rod 156 makes this less, but it is still a large ratio (64:1). The reduction of the moving mass has many benefits such as reduced power consumption, reduced stress, and reduced size for the mechanism. The possibility of compatibility with silicon integration is thus enhanced.

Figure 9:
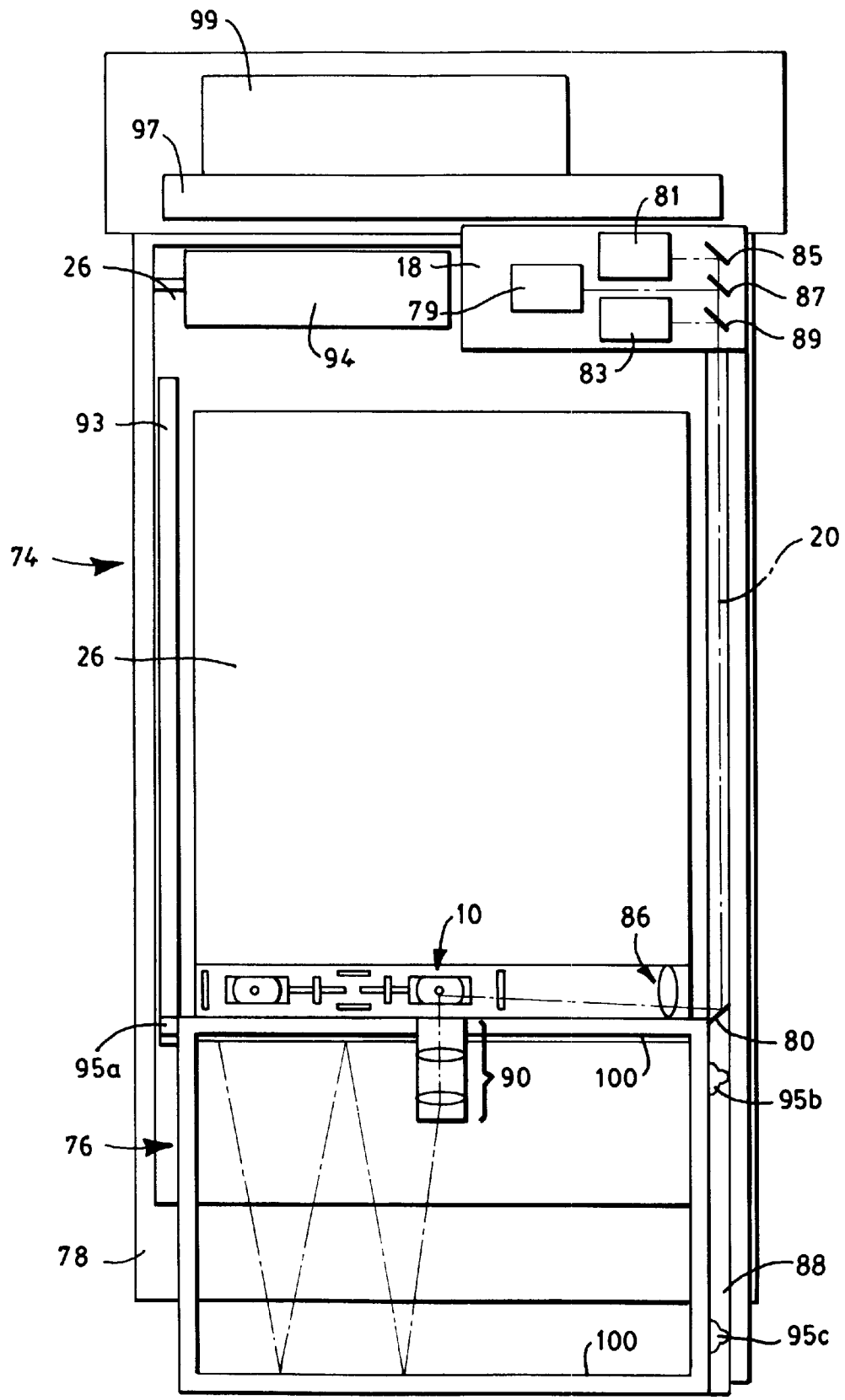
FIG. 9 is a top cross-sectional view of a printer utilizing the bouncing ball scanner of FIG. 1.

Referring now to FIG. 9, there is shown a printer 74 implementing the bouncing ball scanner 10 of the invention. The bouncing ball scanner 10 is shown in a configuration later herein described with reference to FIG. 13. In this printer 74 the optical path is laid out such that a single beam of modulated light 20 is passed to a moving carriage 76 where it is then scanned across the photosensitive medium 26. There are numerous other embodiments that change the optical path from what is herein described and all of those possibilities are within the intent of the invention. In this the preferred embodiment, the printer housing 78 holds the photosensitive medium 26 which is an integral film, such as that described in commonly assigned U.S. Pat. No. 4,563,411 entitled "Copolymeric Mordants and Photographic Products and Processes Containing Same" and issued to Irena Y. Bronstein-Bonte on Jan. 7, 1986.

The carriage 76 scans along a length of the photographic medium 26 as the bouncing ball scanner 10 redirects light along a width of the photographic medium 26, thereby imaging multiple lines thereon to create a photographic image as dictated by an attached computer (not shown). This is accomplished by receiving signals from the attached computer and translating them into image-bearing light. This translation is performed by the modulated light source 18 in a way commonly known in the art. A red light source such as a collimated red light emitting diode ("LED") 81 emits red light for an individual pixel. The red light is reflected off a mirror 85 such that it is now running parallel to a length of the housing 78. A green light source 79 such as a green LED then projects green light in accordance with needs of the pixel. A green light is then reflected off of a red pass mirror merging with the red light. The red pass mirror allows only red light to be transmitted from a back side of the red pass mirror 87 and is joined with the green light from the green light source 79, such that a combined light beam is created. A blue light source 83 projects blue light off of a red green pass mirror 89 and a modulated light beam 20 is then formed representing one pixel.

The modulated light beam 20 is then reflected off of a triangular mirror 80 which is moving with the carriage 76. Modulated light beam 20 now traveling transverse to the length of the housing through a beam reduction lens 86 which decreases a diameter of the light beam and projects it into the bouncing ball scanner 10. The modulated light beam 20 then reflects off the reflective ball in the bouncing ball scanner 10 through a projection lens 90 into a folding mirror 100, where it is then redirected down onto the photosensitive medium 26 across a width thereof.

As the modulated light beam 20 is being scanned across a width of the photosensitive 26, the carriage 76 is moving along a length of the photosensitive medium 26. The carriage 76 travels on contacts 95b and 95c in a V-groove 88 on one side of the printer housing 78, and on the other side of the printer housing 78 the carriage is attached to a rail 93 by a rail guide 95a to ensure linear motion.

Once the print is complete, a spread roller 97 is driven by a spread motor 99 bursts a pod on the photosensitive medium 26, spreading chemicals necessary for final development of the instant film of this example, thereby completing the printing process. The photosensitive medium 26 is then driven from the printer for examination by a user.

Figure 10:
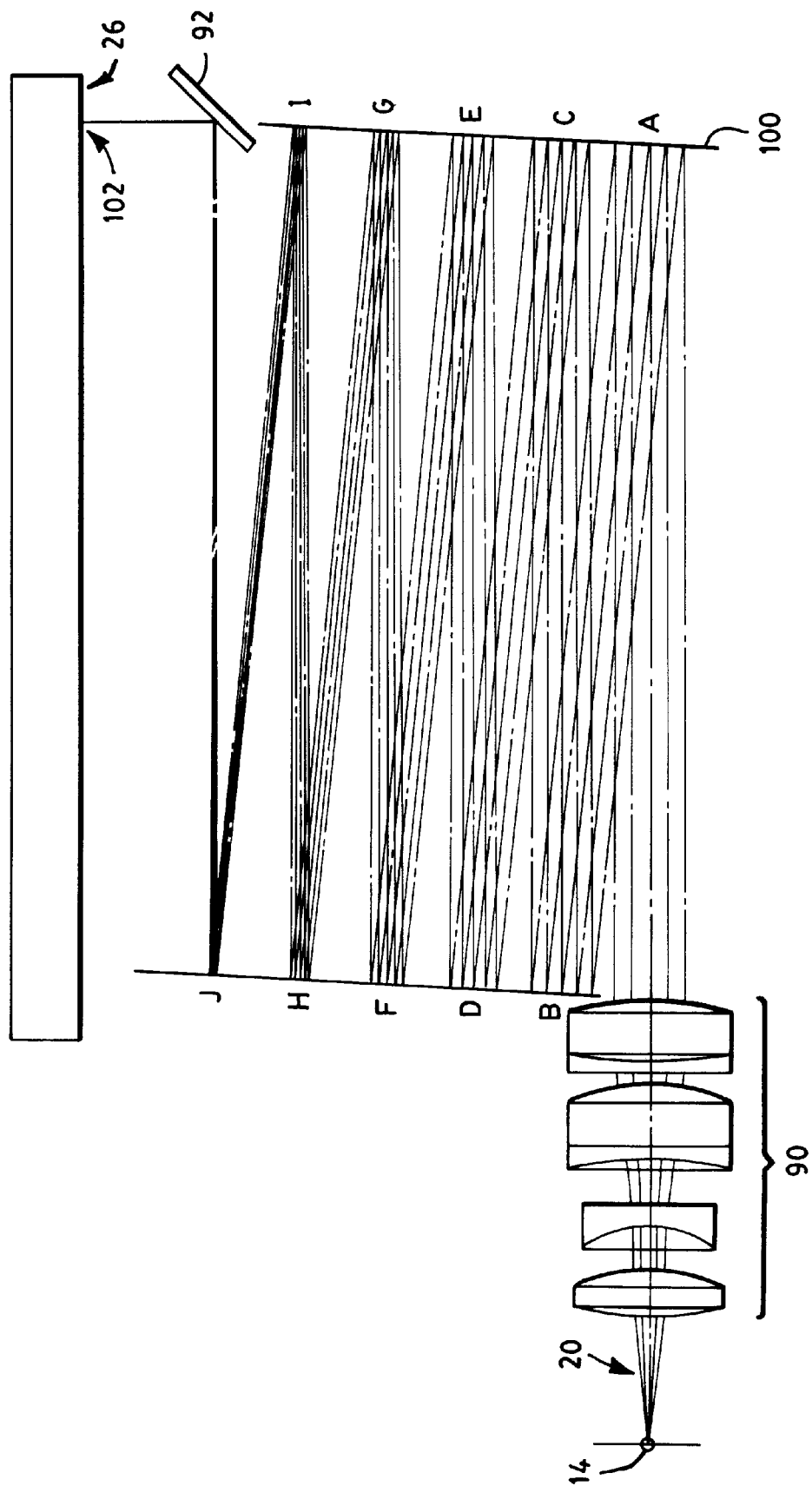
FIG. 10 is an optical system associated with the printer of FIG. 9 for properly imaging light reflected through the bouncing ball scanner.

FIG. 10 shows in more detail the optical path of the modulated light 20 after it is reflected off the reflective ball 14. The modulated light 20 passes through the projection lens system 90 which is comprised in the preferred embodiment of 4 individual lenses. Modulated light 20 then passes through a folding mirror 100 as projected onto the photosensitive medium 26.

The folding mirror 100 takes the collimated light from lens 90 and merges the modulated light 20 into a single point 102 on the photosensitive medium 26. This is done by folding a mirror in such a way that the light comes closer together after each reflection. On reflection A, the light rays are their farthest point from each other. The reflection B shows the rays of light slightly closer, and as through C, D, E, F, G, H, I, J the light slowly merges until a single point or pixel 102 is formed on the photosensitive medium. A mirror 92 is also shown as an option to redirect the light to allow variable orientation of the photosensitive medium 26.

Figure 11:
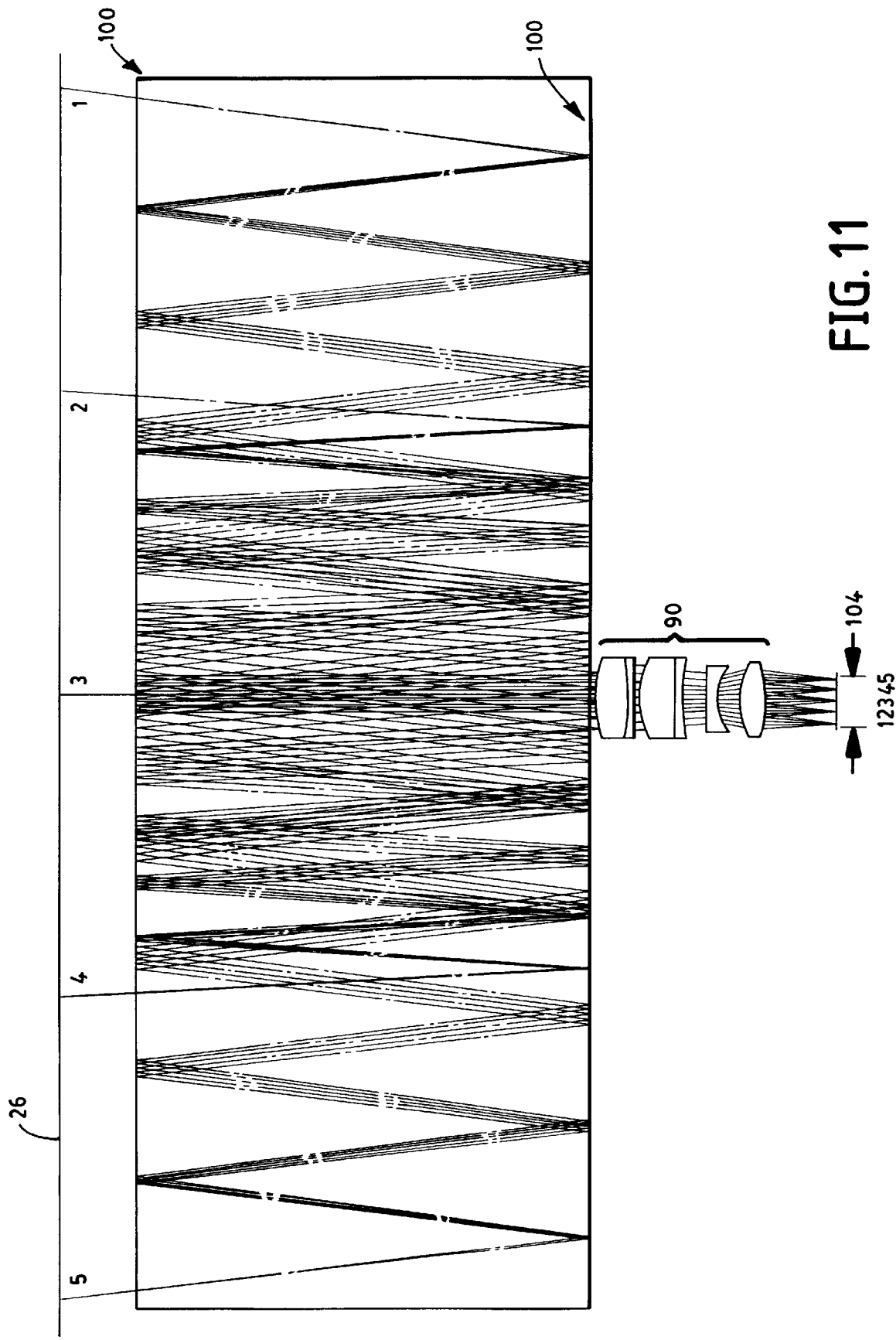
FIG. 11 is an alternative view of the optical elements and light reflection of FIG. 10.

FIG. 11 illustrates how multiple beams of light are scanned across the photosensitive medium 26. There is shown five beams of light marked 1, 2, 3, 4, and 5, thus scanned across a distance 104 which is representative of a full range of travel of the reflective ball 14 in the bouncing ball scanner 10. It should be noted that far more than five beams of light will be reflected off the ball over the course of this distance 104, but only 5 are shown for the sake of illustration. When beam 1 is projected into the projection lens system 90, shown coming in from the left side of the lens system 90, the reflections as shown in the previous FIG. 10 are such that the beam merges by the time it gets to an end point again marked 1 on the photosensitive medium 26. The modulated light beam 2 follows a similar path, but where the angle going into the projection lens system 90 is not as great as the angle of modulated light beam 1. The angle coming out of the projection lens system 90 is also not as great, and therefore over the course of the reflections is merged into a single light beam, emerges from the folding mirror 100 at a point marked 2 on the photosensitive medium. Light beam 3 has essentially no angle with respect to the previous light beams and therefore comes out of the projection lens system 90 at essentially no angle to the projection lens 90 and is thus imaged essentially directly onto the photosensitive medium 26. Likewise beams 4 and 5 are reflected in angles as previously described but on opposite ends of the photosensitive medium 26.

Figure 12:
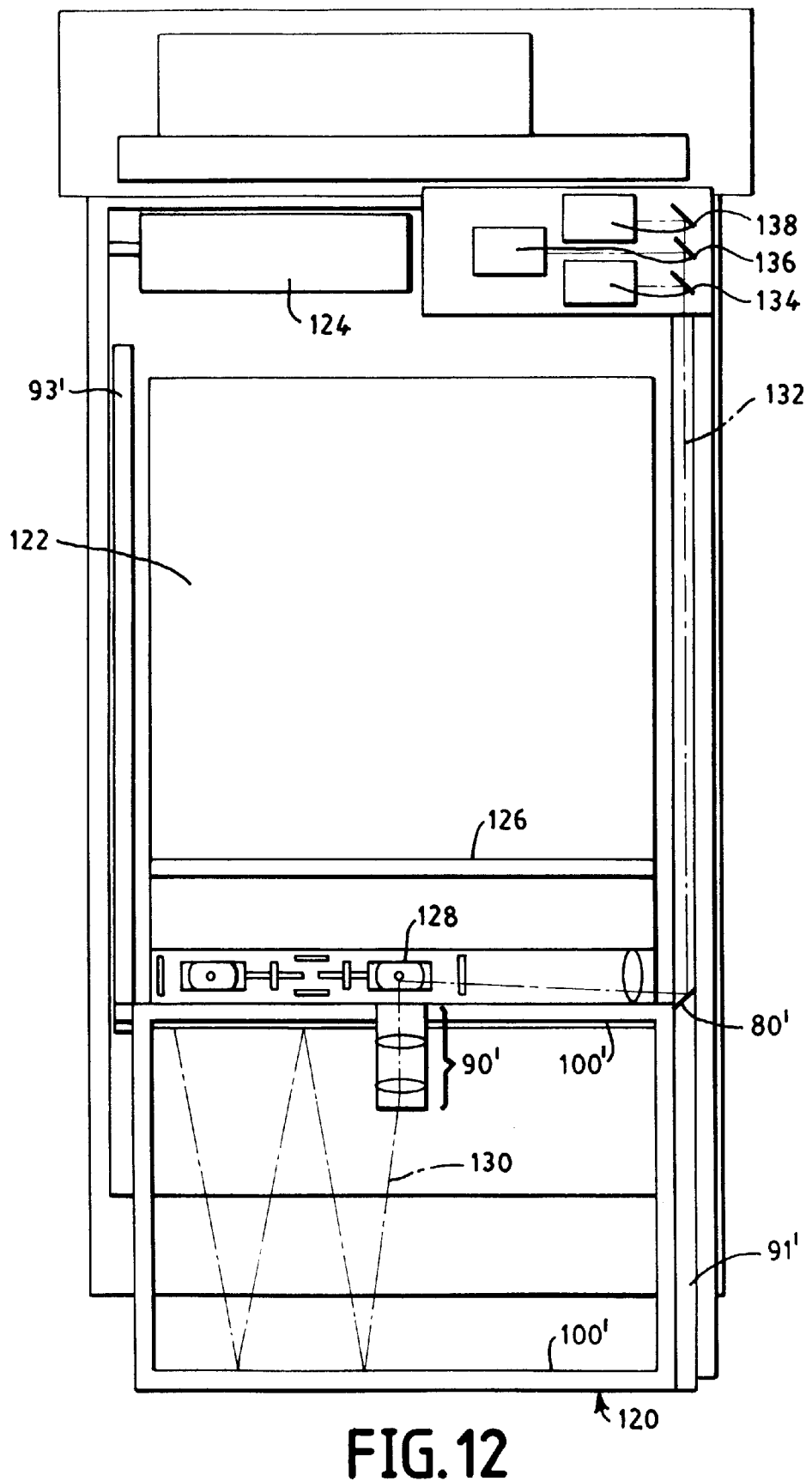
FIG. 12 shows a cross-sectional view of a scanner using the bouncing ball scanner where light is reflected off a subject and read into a computer.

Referring now to FIG. 12, there is shown an alternative embodiment of the invention. In this embodiment, the bouncing ball scanner 10 is being used in a scanner 120 to scan a subject 122 into a computer (not shown). The subject 122 may be photographic material, pre-printed material having an image imprinted thereon, or any other such image-holding material which a user wishes to scan into a computer, but is exemplified in the illustration as a photograph.

Scanning is accomplished by shining light from a light source 126 onto the subject 122. Image-bearing light 130 reflected off of the subject 122 now contains image information. The light source 126 illuminates only one line at a time and is scanned across the subject 122 by a slow scan motor 124 such that the entire subject 122 is scanned. The image-bearing light 130 passes through a lens 90' to reduce a diameter of a light beam and redirect the light beam off the ball 128. The image-bearing light 130 then reflects off of the ball lens 128 which is reciprocating in a way as previously described.

The image-bearing light 130 is then redirected by a mirror 80' to be electronically collected. The image-bearing light 130 first strikes a red-green pass mirror which reflects blue light into a blue photodiode 134. The blue photodiode 134 collects the blue light and passes an electronic representation of a level of blue light to the computer. The red-green light beam passes through the red-green pass mirror and strikes a red-pass mirror. Like the blue, the green is reflected to a green photodiode 136. The green photodiode 136 collects the green light and passes an electronic representation of a level of green light to the computer. Likewise, the red light passes through the red-pass mirror and is reflected through a reflective mirror to a red photodiode 138. The red photodiode 138 collects the red light and passes an electronic representation of a level of red light to the computer. The combination of the electronic signals from each of the photodiodes 134, 136, 138 is decipherable by a computer to create an image according to the subject 122.

Figure 13:
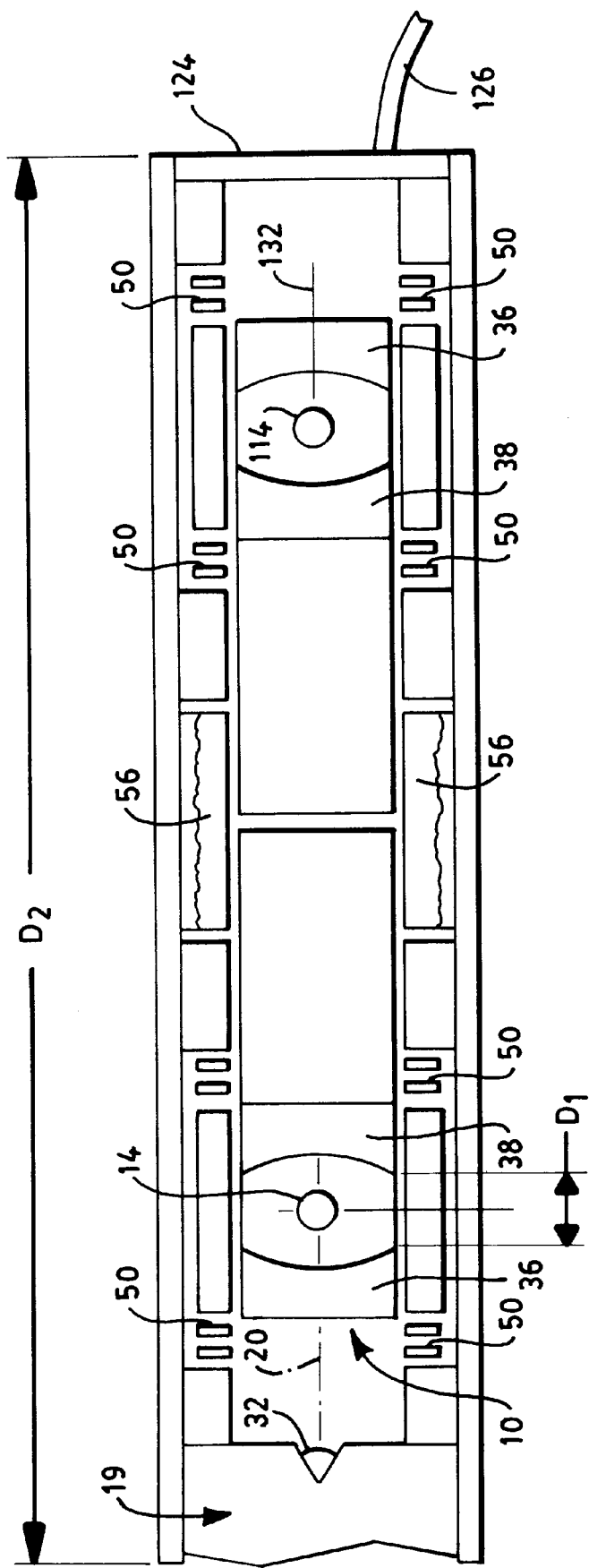
FIG. 13 is a balanced dual bouncing ball scanning system utilizing the bouncing ball scanner of FIG. 1 and FIG. 12 for use in a print scanning device as shown in FIG. 9.

FIG. 13 shows an embodiment of the invention having two bouncing-ball scanners 10 used to balance each other. To attain a proper balance, the balls in each of the bouncing ball scanners 10 are reciprocated at the same frequency but one hundred eighty degrees out of phase from each other. By doing so, vibration due to an impact of one ball against an end of the capsule is offset by an impact of the other ball against an opposite end of its capsule, thereby canceling vibration in the system.

In this FIG. 13, the modulated light beam 20 is projected against the bouncing/reflective ball 14 reciprocating over a distance $D_1$. Distance $D_1$ is determined by the Rayleigh Range, well known in the art, to limit light beam divergence to less than a predetermined amount. In the preferred embodiment, the predetermined amount is four percent. By keeping the distance $D_1$ within the Rayleigh range, the printer insures that the modulated light beam 20 remains a narrow, focused beam thus creating a precisely defined pixel on the photosensitive medium.

Springs 50 are shown mounted to capsule 12 as previously described. On an opposite end, incoming light can be received by the ball lens 114 and reflected such that it is incident upon a CCD 124 and is passed into a computer via CCD wire 126. In the preferred embodiment this entire structure has a length D2 and is approximately fifty-five millimeters.

Figure 14:
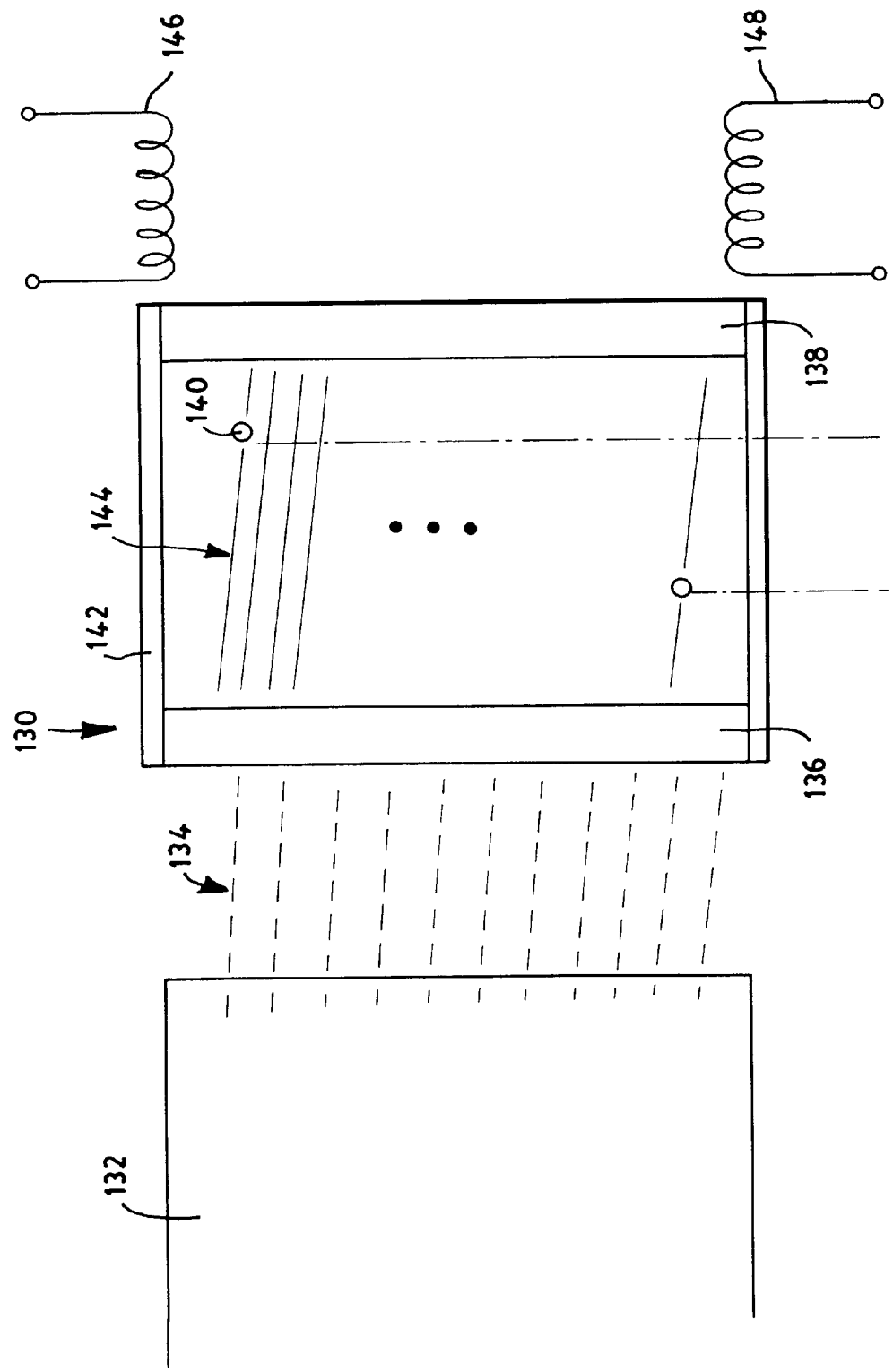
FIG. 14 is an alternative embodiment of the imaging apparatus utilizing a two-dimensional bouncing ball scanner where the ball is bi-directionally driven using magnetics.

FIG. 14 shows a way to modulate light across a photosensitive medium bidirectionally. In this embodiment the capsule 130 is elongated that has a length and a width proportional to an aspect ratio of a photosensitive medium which is to be imaged. A paramagnetic reflective ball 140 starts at one end of the capsule 130 and is driven off a transparent wall 136 against a back wall 138 as previously described. In this embodiment, the light source is a sheet light source 132 which projects collimated image-bearing light 134 across an entire width of the capsule 130. The only light reflected down at the proper angle off of the ball 140 is that light associated with an individual pixel to be imaged. The bouncing ball 140 is then driven along a path 144 at an angle with respect to the transparent wall 136 by electromagnets 146 and 148. The magnetic field is substantially linear such that the ball is in a known position in two dimensions at any given time. In this way, no relative motion must be used to image an entire photosensitive medium 26, i.e., neither the photosensitive medium 26 nor the bouncing ball capsule 130 needs to move with respect to each other.

The invention may be embodied in other specific forms without departing from the spirit or essential characteristics thereof. For example, the invention can be applied to projection displays simply by increasing a display refresh rate, i.e. substantially increasing the capsule frequency. Another example is to use the invention in a camera. A further example is to use the invention to create a virtual display on a user's retina. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. An imaging apparatus for reciprocally scanning image-bearing light across a photosensitive medium, the imaging apparatus comprising
   a housing;
   a capsule disposed within the housing having a proximal end portion and a distal end portion integrally joined by a lateral surface, the proximal end portion and at least a horizontal section of the lateral surface being optically transmissive;
   elastic means for mechanically securing the capsule to the housing while allowing reciprocal motion of the capsule within the housing;
   redirection means enclosed within the capsule for redirecting the image bearing light traveling in a first direction to travel in a second direction such that the image-bearing light is incident upon the photosensitive medium; and
   vibration means for causing the reciprocal motion of the capsule forcing the redirection means to impact repetitively off the proximal end portion and the distal end portion thus reciprocating along a central axis thereby scanning the image-bearing light across the photosensitive medium.

2. The imaging apparatus according to claim 1 further comprising slow scanning means for introducing relative motion between the housing and the photosensitive medium such that the scanning of the image-bearing light across the photosensitive medium by the vibration means projects consecutive lines of an image onto the photosensitive medium.

3. The imaging apparatus according to claim 1 wherein the lateral surface of the capsule is tubular and the distal end and the proximal end are disks sized to have an interference fit within the lateral surface so as to integrally enclose the redirection means.

4. The imaging apparatus according to claim 3 wherein the lateral surface of the capsule is substantially opaque except for the horizontal section which extends horizontally of the capsule and is in an optical path between the reflection means and the photosensitive medium.

5. The imaging apparatus according to claim 4 wherein the horizontal section of the lateral surface of the capsule is a fiber lens which corrects for astigmatism.

6. The imaging apparatus according to claim 3 wherein the lateral surface of the capsule is transparent to provide optical transmissiveness about a circumference of the capsule and thus the horizontal section is not restricted about the circumference.

7. The imaging apparatus according to claim 1 wherein the proximal end portion and distal end portion of the capsule are substantially parallel and opposed.

8. The imaging apparatus according to claim 7 wherein the proximal end portion and distal end portion are concave having a predefined arc such that centers of virtual spheres extrapolated from the predefined arcs define the central axis on which the redirection means travels.

9. The imaging apparatus according to claim 1 wherein the elastic means is a spring.

10. The imaging apparatus according to claim 1 wherein the elastic means is a resilient disk which defines a plane, the resilient disk having cuts defining an outer portion and an inner portion, the outer portion being substantially fixed within the plane and the inner portion being biased to remain in the plane but being movable along an axis transverse to the plane.

11. The imaging apparatus according to claim 10 wherein the cuts in the resilient disk are overlapping 'L'-shaped cuts.

12. The imaging apparatus according to claim 1 wherein redirection means redirects the image-bearing light to travel in the second direction which is substantially orthogonal to the first direction.

13. The imaging apparatus according to claim 1 wherein the redirection means is fabricated from a highly reflective metal.

14. The imaging apparatus according to claim 1 wherein the redirection means is paramagnetic.

15. The imaging apparatus according to claim 1 wherein the redirection means is an industrial-quality gem.

16. The imaging apparatus according to claim 1 wherein the image-bearing light is light reflected off of a subject and the redirection means redirects the image-bearing light into the imaging apparatus where the photosensitive medium receives the image-bearing light and translates the image-bearing light into electrical signals interpretable by a computer.

17. The imaging apparatus according to claim 16 wherein the redirection means is fabricated of optical glass.

18. The imaging apparatus according to claim 1 wherein the redirection means is spherical.

19. The imaging apparatus according to claim 1 wherein the redirection means is non-spherical.

20. The imaging apparatus according to claim 19 wherein the redirection means comprises
   a rod having a substantially cylindrical shape elongate along a vertical axis substantially perpendicular to the central axis and having at least one reflective portion on an end of the rod disposed in optical alignment with the image-bearing light; and
   an oblate spheroid embedded at a center position on the rod having substantially opposed impact areas for mechanically contacting the distal and proximal end portions of the capsule.

21. The imaging apparatus according to claim 20 wherein the rod is magnetic having a dipole axis corresponding to the vertical axis of the rod.

22. The imaging apparatus according to claim 21 further comprising attractive means for providing a magnetic field to the capsule such that the at least one reflective portion of the rod remains illuminated by the image-bearing light in the capsule.

23. The imaging apparatus according to claim 20 wherein the oblate spheroid has a geometric axis is perpendicular to the rod and substantially parallel to the central axis of the capsule.

24. The imaging apparatus according to claim 20 wherein the oblate spheroid is fabricated to have smooth surface with high mechanical strength.

25. The imaging apparatus according to claim 20 wherein the impact areas of the oblate spheroid have an arcuate shape where the arcuate shape substantially matches a concave surface of the proximal end portion and distal end portion.

26. The imaging apparatus according to claim 20 wherein the oblate spheroid is fabricated of a material having different properties than that of the rod.

27. The imaging apparatus according to claim 1 wherein the imaging apparatus has a scanning section and a printing section, the scanning section receives the image-bearing light after the image-bearing light is light reflected off of a subject such that the photosensitive medium can translate the image-bearing light into electrical signals interpretable by a computer, the printing section for illuminating a second photosensitive medium with image-bearing light dictated by electrical signals from the computer to form a printed image thereon.

28. The imaging apparatus according to claim 1 wherein the vibration means comprises an electromagnetic coil for pulsing a magnetic field against the elastic means which is paramagnetic thereby causing the elastic means to reciprocate.

29. The imaging apparatus according to claim 1 wherein the reciprocal motion of the vibration means is substantially periodic at a resonant frequency of a total mass of at least the capsule and the redirection means.

30. The imaging apparatus according to claim 1 further comprising second attractive means for drawing the redirection means in a direction substantially transverse to the central axis such that the scanning of the image-bearing light across the photosensitive medium by the vibration means projects consecutive lines of an image onto the photosensitive medium.

31. The imaging apparatus according to claim 30 wherein the attractive means is at least two opposed electromagnets governing a position of the redirection means transverse to the central axis.

32. The imaging apparatus according to claim 30 further comprising a sheet light source which projects the image-bearing light elongate along a width of the capsule.

33. The imaging apparatus according to claim 1 further comprising a projection lens suspended on a stalk between the capsule and the photosensitive medium.

34. The imaging apparatus according to claim 33 wherein the stalk is flexible to provide movement of the projection lens relative to the capsule to compensate for effects on the redirection means due to gravity.

35. The imaging apparatus according to claim 1 wherein the projection lens compensates for astigmatism.

36. An optical printer suitable for printing an image onto a photosensitive medium, said printer comprising:
   a housing adapted to exclude external light;

a modulated light source disposed within said housing for projecting a beam of light modulated to represent a sequence of pixels of the image;

reflective means disposed in an optical path between the medium and said beam of modulated light for redirecting said beam across the photosensitive medium;

reciprocating means providing movement along a central axis, said reciprocating means in intermittent contact with said reflective means such that said reciprocating means imparts a substantially uniform linear reciprocating motion along said central axis to said reflective means;

a capsule for enclosing said reflective means, said capsule comprising a proximal end portion and a distal end portion integrally joined by a lateral surface, said proximal end portion and at least a horizontal section of said lateral surface comprising an optically transmissive material; and, vibration means for providing reciprocal motion to said capsule such that said reflective means alternatively impacts upon said proximal end portion and said distal end portion to reciprocate along said central axis.

37. An optical scanner suitable for converting a printed image into electrical signals representative of the image, said scanner comprising:

a light source for illuminating a portion of the printed image to produce reflected image-bearing light a photodetector for receiving said image-bearing light and converting said received light into corresponding electrical signals;

reflective means disposed in an optical path between said photodetector and said image-bearing light for sequentially redirecting said image-bearing light pixel-by-pixel across said photodetector such that said photodetector generates an electrical signal for the corresponding pixel;

reciprocating means providing movement along a central axis, said reciprocating means in mechanical communication with said reflective means such that said reflective means acquires a substantially uniform linear reciprocating motion along said central axis;

a capsule for enclosing said reflective means, said capsule comprising a proximal end portion and a distal end portion integrally joined by a lateral surface, said proximal end portion and at least a horizontal section of said lateral surface comprising an optically transmissive material, and;

vibration means for providing reciprocal motion to said capsule such that said reflective means alternatively impacts upon said proximal end portion and said distal end portion to reciprocate along said central axis.

38. A combined printer and scanner, said printer suitable for printing a first image communicated from a computer onto a print medium, said scanner suitable for reading a second image from a subject medium and transmitting electrical signals representative of the second image to the computer, said printer and scanner comprising:

a housing comprising a compartment for holding at least one of the print medium and the subject medium;

scanning means disposed within said housing for reading the second image from the subject medium when in a scan mode and for translating the second image into electrical signals interpretable by the computer, said scanning means comprising a light source for illuminating at least one of the print medium and the subject medium and generating reflected image-bearing light, said scanning means further comprising a photodetector adapted to receive said reflected image-bearing light and produce the corresponding electrical signals;

printing means disposed within said housing for printing a first image communicated from a computer onto the print medium when in a print mode;

reflective means disposed in an optical path between said light source and at least one of the media;

reciprocating means providing movement along a central axis, said reciprocating means in intermittent contact with said reflective means such that said reciprocating means imparts a substantially uniform linear reciprocating motion along said central axis to said reflective means;

a capsule for enclosing said reflective means, said capsule comprising a proximal end portion and a distal end portion integrally joined by a lateral surface, said proximal end portion and at least a horizontal section of said lateral surface comprising an optically transmissive material; and, vibration means for providing reciprocal motion to said capsule such that said reflective means alternatively impacts upon said proximal end portion and said distal end portion to reciprocate along said central axis.

* * * * *